United States Patent [19]
Waluda

[11] Patent Number: 5,924,969
[45] Date of Patent: Jul. 20, 1999

[54] WAX DOT MACHINE

[76] Inventor: Casey E. Waluda, 2421 N. Pulaski, Chicago, Ill. 60639

[21] Appl. No.: 08/993,258

[22] Filed: Dec. 18, 1997

[51] Int. Cl.⁶ .............................. B31B 13/00; B31B 17/00
[52] U.S. Cl. .......................... 493/374; 493/379; 493/471; 493/472
[58] Field of Search .................................... 156/578, 552; 118/415, 418; 493/471, 472, 374, 379, 340

[56] References Cited

U.S. PATENT DOCUMENTS

| | | | |
|---|---|---|---|
| 3,695,216 | 10/1972 | Abrams et al. | 118/3 |
| 3,854,031 | 12/1974 | Keller | 493/379 |
| 4,154,640 | 5/1979 | Kenworthy | 156/578 |
| 4,226,209 | 10/1980 | Kenworthy | 118/708 |

Primary Examiner—James F. Coan
Assistant Examiner—Gene L. Kim
Attorney, Agent, or Firm—Arnold White & Durkee

[57] ABSTRACT

An apparatus for manufacturing a wax dot comprising a housing enclosing a rotating drum. The drum has at least one hole in its surface for receiving a wax to form the wax dot. The wax dot apparatus further includes a wax channel in the housing to deliver the wax to the hole and a dispenser within the drum to eject the wax dot from the hole. When the hole in the drum is aligned with the wax channel, the dispenser is positioned away from the surface of the drum to allow the wax to fill the hole to form the wax dot. When the hole rotates away from the wax channel the dispenser gradually moves toward the surface of the drum to gradually eject the wax dot from the hole.

24 Claims, 8 Drawing Sheets

WAX DOT MACHINE

BACKGROUND OF THE INVENTION

1. Field of the Invention

The present invention relates generally to an apparatus for manufacturing wax dots and, more particularly, to an apparatus that efficiently manufactures wax dots.

2. Description of the Related Art

Plastic items, such as clips, message hooks or label holders, require a mounting surface for packaging and shipping to consumers. As is known to one of ordinary skill in the art, plastic clips may be mounted upon wax dots. These wax dots in turn are typically mounted to a packaging sheet or web material. The wax dots provide a raised surface allowing easy placement and removal of the plastic clip. The adhesive character of the wax dots hold the plastic clips to the packaging web. Additionally, when the clips are removed from the wax dots, substantially no adhesive residue remains on the plastic clips.

Figure 1:
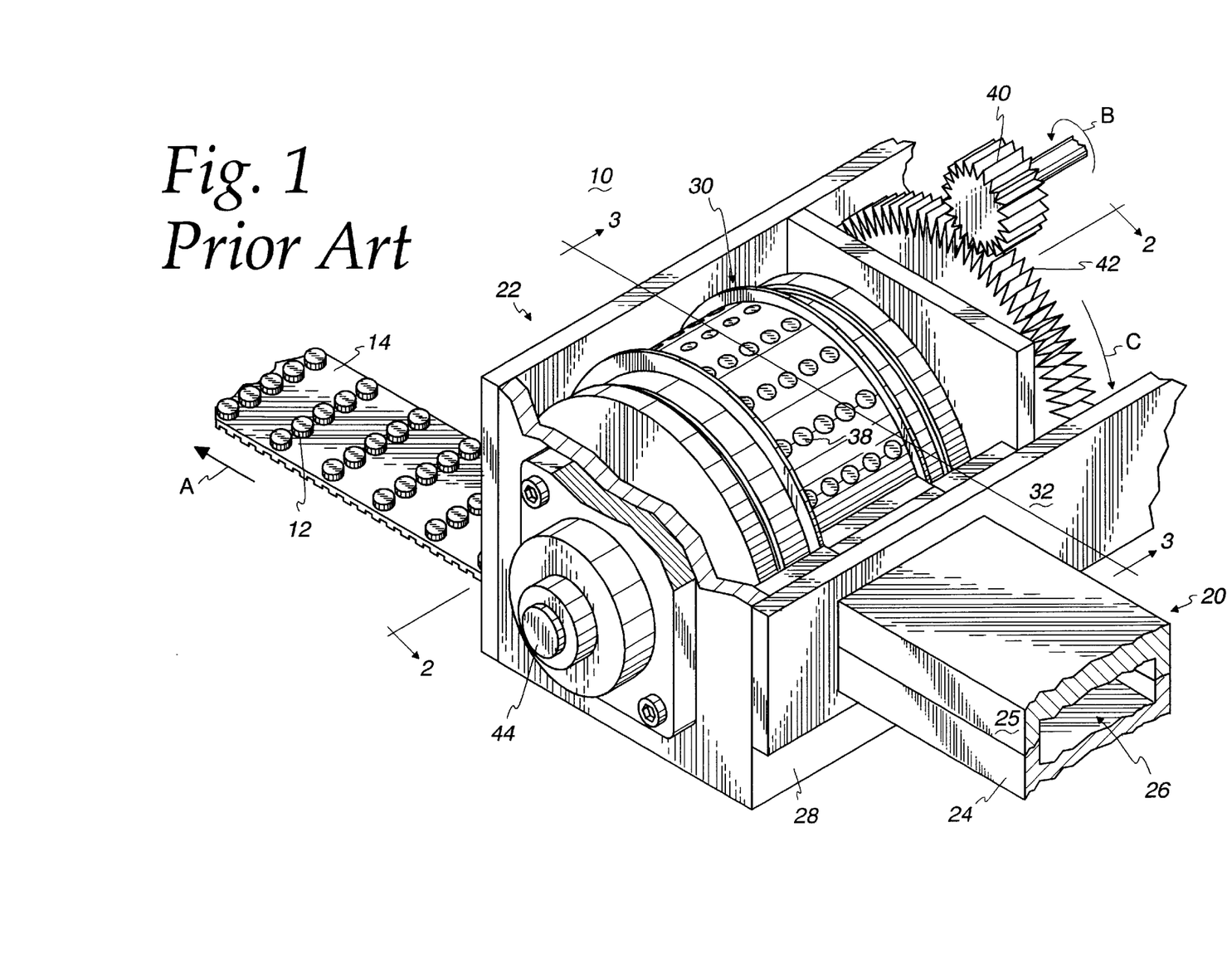
FIG. 1 is an isometric view of a prior art wax dot machine.

A wax dot machine 10 illustrated in FIG. 1 has been used in the art to produce wax dots 12 on a packaging web 14. The wax dot machine 10 forms a row of five wax dots 12 on the web 14. The web 14 is typically a semi-rigid plastic sheet. Each wax dot 12 is a cylinder with a diameter of approximately $3/8$ inch and a height of approximately $1/4$ inch. When plastic clips are placed onto the wax dots 12, the clips (not shown) adhere to the wax dot 12 until consumers remove them from the wax dots 12.

The wax dot machine 10 continuously produces rows of five wax dots 12 onto the web 14. The web 14 moves in the direction of the arrow A at a constant speed providing approximately equal spacing between adjacent rows of wax dots 12. The web 14 unrolls from a roll of packaging web (not shown) and passes between a pull roller 16 (see FIG. 3) and the wax dot machine 10.

Figure 2:
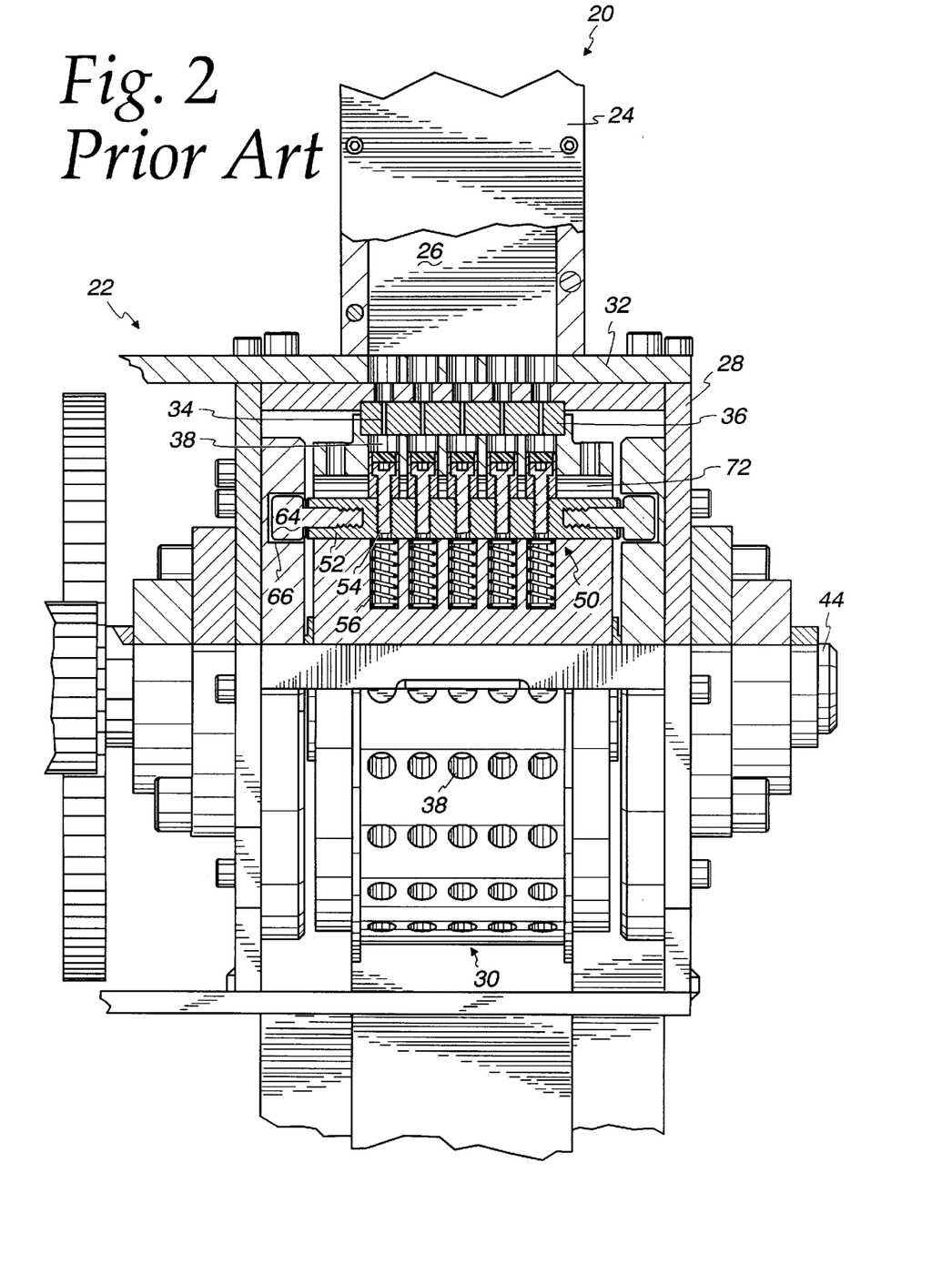
FIG. 2 is a top view of the prior art wax dot machine of FIG. 1 along line 2—2.
Figure 3:
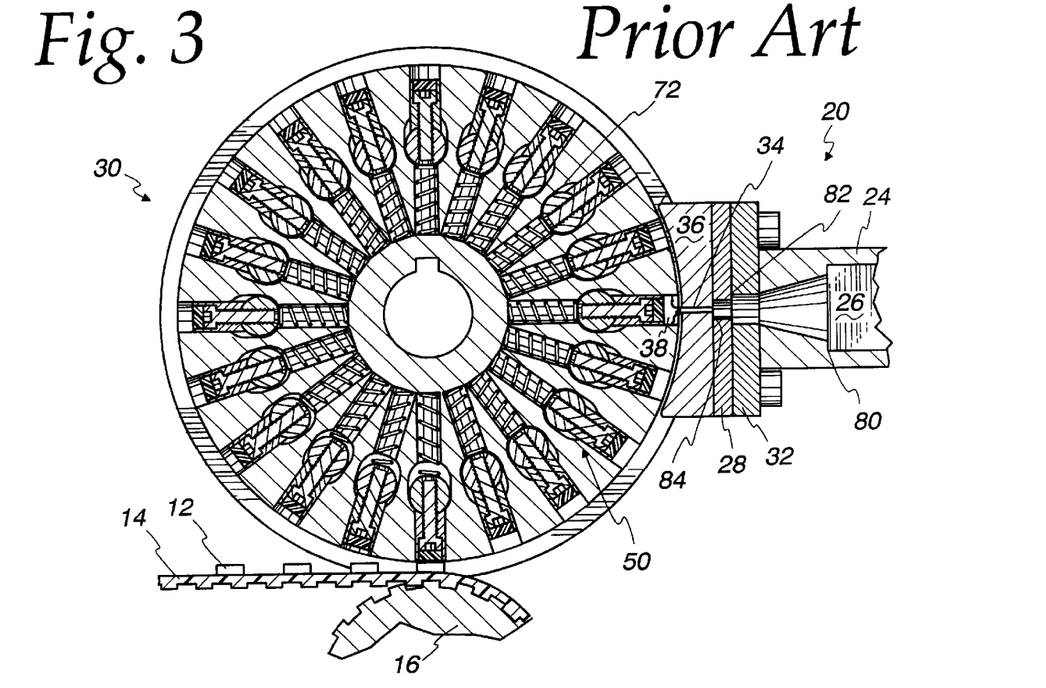
FIG. 3 is front view of the prior art wax dot machine of FIG. 1 along line 3—3.

The wax dot machine 10 comprises a wax feeder 20 and a wax dot former 22. The wax feeder 20 comprises a housing 24 enclosing a wax channel 26. The housing 24 comprises two halves 25 that joined together. FIGS. 2 and 3 illustrate the wax channel 26. The wax dot former 22 comprises a housing 28 and a drum 30. A connecting plate 32 connects the housing 24 of the wax feeder 20 to the housing 28 of the wax dot former 22. The wax channel 26 travels through the housing 24 of the wax feeder 20 and divides into five portions which pass through the connecting plate 32 and the housing 28 of the wax dot former 22 to five bores 34 in a block 36. The housings 24 and 28, drum 30, connecting plate 32, and block 36 are composed of steel.

The wax feeder 20 communicates a wax from a wax supply (not shown) through the wax channel 26 to the bores 34. Briefly, a wax plunger (not shown) with a cross-section substantially matching the cross-section of the wax channel 26 moves toward the wax former 22 forcing the wax within the wax channel 26 toward the bores 34. Because the wax is flowable under pressure at room temperature, the pressure provided by the wax plunger moving toward the wax former 22 forces the wax through the bores 34. When the wax plunger retracts, additional wax enters the wax channel 26 from the wax supply.

The wax dot former 22 of the wax dot machine 10 comprises the drum 30 within the housing 28. The drum 30 has twenty rows of five holes 38. The holes 38 have a diameter of approximately $3/8$ inch. When the holes 38 are aligned with the bores 34, the holes 38 have a depth of approximately $1/4$ inch, and each hole 38 receives wax from the wax feeder 20. The wax passes through the bores 34 and fills the holes 38 forming the wax dots 12. In order to fill each of the one hundred holes 38 and deposit the wax dots 12 onto the web 14, the drum 30 rotates within the housing 28. To rotate the drum 40, a motor (not shown) rotates a driver gear 40 in the direction of arrow B. This causes a driven gear 42 to move in the direction of arrow C which rotates the drum 30 in the direction of arrow C about the axis 44 of the drum 30. The rotational speed of the drum 30 is approximately 45 revolutions per minute.

As the drum 30 rotates about its axis 44, one of the rows of holes 38 align with the bores 34. FIG. 3 illustrates the hole 38 aligned with the bore 34 at point 46. Wax from the wax channel 26 passes through the bore 34 and into the hole 38. The rotational speed of the drum 30 allows each of the five holes 38 to completely fill with wax before they move past the bores 34. The block 36 traps the wax within the hole 38 to provide the wax dot 12 with a substantially flat portion that will readily adhere to the web 14.

Figure 4:
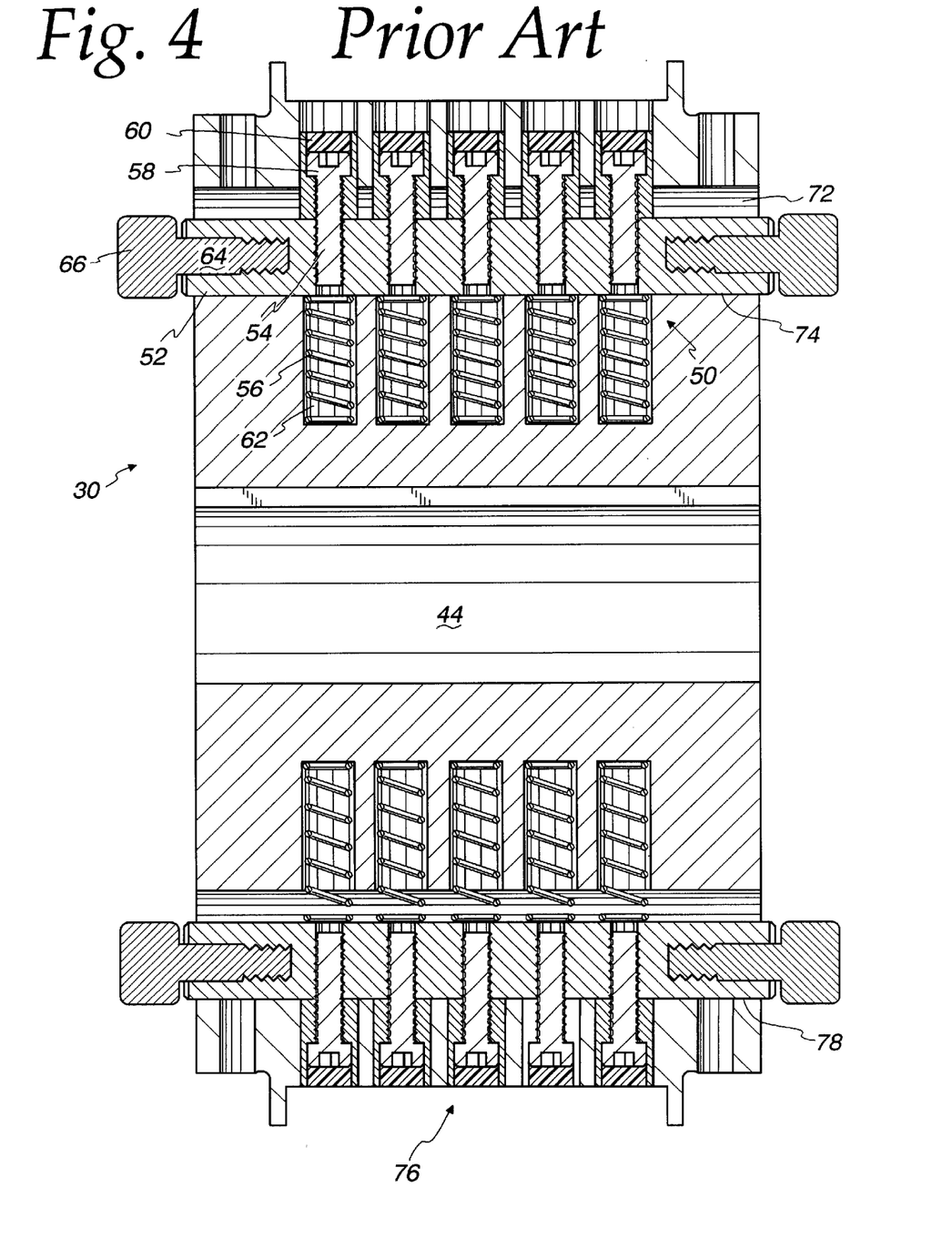
FIG. 4 is a side view of the prior art wax dot machine of FIG. 1.

Within the drum 30 beneath each row of holes 38 is a wax dot dispenser 50. The dispenser 50 is best illustrated in FIG. 4. The dispenser 50 comprises a cam follower 52, screws 54 and springs 56. Corresponding to the five holes 38, five screws 54 screw into the cam follower 52. Positioned within each hole 38 is a head 58 of each screw 54. The diameter of the head 58 is slightly less than the diameter of the hole 38 to allow the screw head 58 to move within the hole 38. Each head 58 of the screws 54 have a silicon rubber cap 60 that corresponds to the bottom of the hole 38. As illustrated in FIG. 4, the cap 60 covers the screw head 58 to prevent the wax from entering and sticking to the socket of the screw head 58. The cap 60 provides a non-stick surface for the wax dot 12 allowing the wax dot 12 to be easily deposited onto the web 14.

Figure 5:
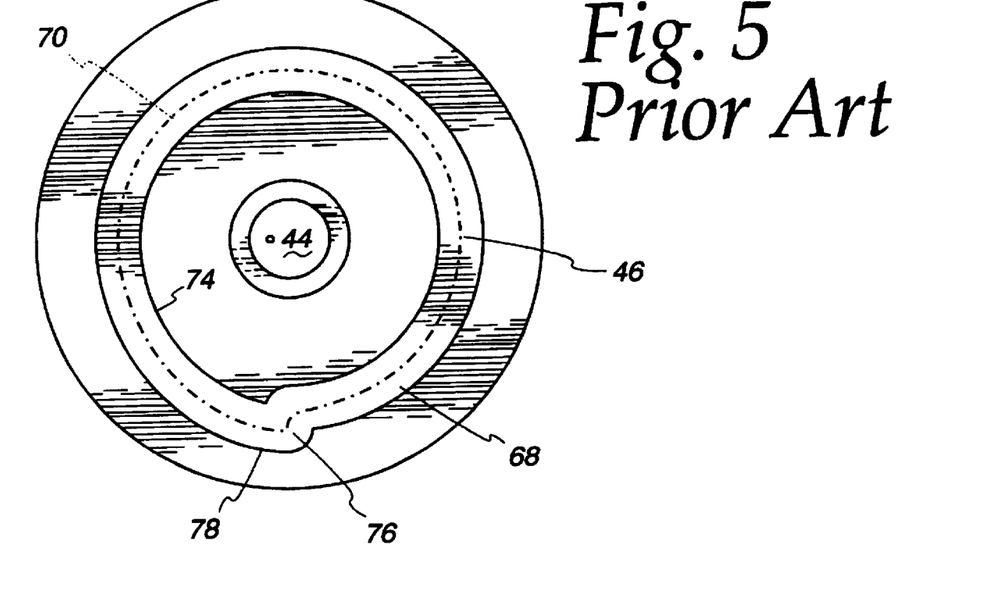
FIG. 5 is a front view of the prior art wax dot machine of FIG. 1.

The dispenser 50 has five springs 56 positioned within five wells 62 in the drum 30 located on the opposite side of the cam follower 52 as the screws 54. The ends of the springs 56 extending from the wells 62 abut the cam follower 52. The cam follower 52 has bolts 64 connected at either end forming heads 66 that rest within a cam 68 in the housing 28. FIG. 5 illustrates the cam 68. The width of the cam 68 is slightly greater than the diameter of the head 66 to allow the head 66 to move along the cam 68 as the drum 30 rotates. The rotational movement of the drum 30 moves the cam follower 52 with head 66 around a follower path 70 in the housing 28. The cam 68 is nearly circular with a sudden kick-out point 76 to coordinate the dispensing of wax dots 12 from their holes 38. Following the cam 68, the cam follower 52 moves toward the axis 44 of the drum 30 to receive wax within the holes 38 at point 46 and suddenly away from the axis 44 of the drum 30 to deposit the wax dots 12 on the web 14 at the kick-out point 76. To allow motion of the cam follower 52 relative to the axis 44 of the drum 30, each cam follower 52 rests within an oval bearing 72.

FIGS. 3 and 4 illustrate the operation of the dispenser 50 of the wax dot machine 10. When each row of holes 38 align with the bores 34, the cam 68 positions the cam follower 52 against the wall 74 of the oval bearing 72 closest to the axis 44 of the drum 30. When the cam follower 52 is positioned against wall 74 of the oval bearing 72, the springs 56 compress, and the screws 56 create the hole 38 with a depth equal to the desired height of the wax dot 12. When the holes 38 align with the bores 34, the wax fills the empty space within the holes 38. As the drum 30 rotates, the cam follower 52 follows the follower path 70 provided by the cam 68. For approximately less than 90 degrees from the bores 34, the cam 68 keeps the cam follower 52 against the wall 74 of the oval bearing 72. At kick-out point 76, approximately 90 degrees from the bore 34, the cam 68 suddenly allows the compressed springs 56 to relax forcing the cam follower 52 against the wall 78 of the oval bearing 72 farthest from the axis 44. FIG. 4 illustrates a cross section of the drum 30 to illustrate the dispenser 50. At the kick-out point 76, the wax dot 12 springs toward the web 14. The expanding springs 56 at the kick-out point 76 reject the wax dot 12 from its hole 38. When the wax dot exits the wax dot former 22, the wax dot 12 contacts and adheres to the web 14. After the kick-out point 76, the cam 68 again forces the cam follower 52 against wall 74 and compresses the springs 56.

FIG. 3 illustrate one problem with the prior art wax dot machine 10. Sharp corners 80, 82 and 84 obstruct the flow of the wax within the wax channel 26. The sharp corners 80, 82 and 84 create back pressure away from the bore 34 impeding the free flow of the wax toward the holes 38. The presence of the sharp corners 80, 82 and 84 require the wax to be under considerable pressure within the wax channel 26 to provide ample flow to fill the holes 38. Additionally, the sharp corners 82 and 84 allow leakage of the wax between the housing 28 and connecting plate 32 and between the housing 28 and block 36. Because the wax within the wax channel 26 is under considerable pressure to overcome the back pressure due to the sharp corners 80, 82, and 84, the wax pushes into the spaces between the halves 25 of the housing 24, and between the housing 28, connecting plate 32 and block 36. When the wax pushes between the parts of the wax dot machine 10, the wax leaks from the wax dot machine 10.

Another problem with the wax dot machine 10 is that the block 36 is composed of steel. Because the steel block 36 is in close contact with the steel drum 30 to provide the wax dot 12 with a substantially flat portion that will readily adhere to the web 14 and to prevent wax leakage, the steel block 36 and steel drum 30 suffer wear and develop scratches from continual frictional contact with each other. Wax from the bores 34 fill these scratches and grooves on the block 36 interfering with the rotational movement of the drum 30. This problem is compounded because the wax from the wax channel 26 is under high pressure. Additionally, the scratches and grooves on the block 36 don't provide the wax dot 12 with a substantially flat portion that will readily adhere to the web 14 resulting in non-uniform size wax dots. Moreover, the drum 30 is an expensive portion of the wax dot machine 10. When scratches and groove develop on the surface, the expensive drum 30 must be replaced along with the block 36.

A further problem with the wax dot machine 10 is the screws 54. The screws 54 must be individually aligned and screwed into the cam follower 52 requiring considerable labor. Additionally, the screws 54 must be precisely aligned with threads on the cam follower 52 with little tolerance for error. If the screws 54 are not correctly aligned to the cam follower 52, the screws 54 will not completely screw into the cam follower 52. If the operator forces an incorrectly aligned screw 54, the screw 54 will be angled relative to the hole 38 allowing wax to seep past the screw head 58 and into the bearing 72. When wax leaks into the bearing 72, the sticky wax will not allow the cam follower 52 to move freely within the oval bearing 72 obstructing the kick-out of the wax dots 12. Furthermore, the wax tends to seep to the springs 56. When the wax clogs the springs 56, the wax dot machine 10 will not properly eject the wax dots 12.

Moreover, when the wax leaks into the bearings 72 and springs 56, the wax dot machine 10 must be disassembled. An operator must either clean or replace the bearings 72 and springs 56. Additionally, the operator must affix a new screw 54 to the cam follower 52. These problems with the wax dot machine 10 cause down time and operator labor expenses decreasing the efficiency and productivity of the wax dot machine 10.

Another problem with the wax dot machine 10 is that the silicon rubber cap 60 sometimes disengage from the screw head 58. Because the silicon rubber cap 60 adheres only to the top of the screw head 58 and the socket of the screw head 58, the cap 60 may lose engagement with the screw head 58 and exit the hole 38. If the cap 60 exits the hole 38, the wax filling the hole 38 will stick to the screw head 58 and fail to be deposited onto the web 14.

Another problem with the wax dot machine 10 is the sudden kick-out sometimes fail to eject the wax dot 12. When the wax dot 12 in the drum 30 has rotated to the kick-out point 76, the springs 56 may fail to force the cam follower 52 against the outer wall 78 of the bearing 72. If this happens, the wax dot 12 will not be ejected from the wax dot machine 10.

Thus, a need has arisen for an improved wax dot machine which will provide smooth flow of wax to the holes, will eliminate wax leakage into the bearings, springs and between the housing blocks and connecting block, will deposit wax dots onto the web and will provide efficient production of wax dots with minimal down time.

SUMMARY OF THE INVENTION

In accordance with one aspect of the present invention, there is provided an apparatus for manufacturing wax dots. The apparatus comprises a housing enclosing a rotating drum. The drum has at least one hole in its surface for receiving a wax to form the wax dot. The wax dot apparatus further includes a wax channel in the housing to deliver the wax to the hole and a dispenser within the drum to eject the wax dot from the hole. When the hole in the drum is aligned with the wax channel, the dispenser is positioned away from the surface of the drum to allow the wax to fill the hole to form the wax dot. When the hole rotates away from the wax channel the dispenser gradually moves toward the surface of the drum to gradually eject the wax dot from the hole. The dispenser comprises a plunger fixed to a cam follower that moves along a cam in the housing. To provide the gradual ejection of the wax dot from the hole, the cam has a cam path that gradually forces the cam follower toward the surface of the drum.

In accordance with another aspect of the present invention, there is provided an apparatus for manufacturing wax dots having a tapered wax channel. The apparatus comprises a housing enclosing a rotating drum. The drum has at least one hole in its surface for receiving a wax to form the wax dot. The wax dot apparatus further includes a tapered wax channel in the housing to deliver the wax to the hole and a dispenser within the drum to eject the wax dot from the hole. The wax channel tapers from a larger housing diameter in the housing to a smaller bore diameter proximate the drum.

In accordance with a further aspect of the present invention, there is provided an apparatus for manufacturing wax dots. The apparatus comprises a housing enclosing a rotating drum. The drum has at least one hole in its surface for receiving a wax to form the wax dot. The wax dot apparatus further includes a wax channel in the housing to deliver the wax to the hole and a dispenser within the drum to eject the wax dot from the hole. The dispenser comprises a plunger attached to a cam follower by a holding pin. The plunger has a plunger head located within the hole and a plunger base attached to the cam follower by the holding pin. When the hole in the drum is aligned with the wax channel, the plunger head is positioned away from the surface of the drum to allow the wax to fill the hole to form the wax dot. When the hole rotates away from the wax channel, the plunger head moves toward the surface of the drum to eject the wax dot from the hole.

In accordance with another aspect of the present invention, there is provided an apparatus for manufacturing wax dots. The apparatus comprises a housing enclosing a rotating drum. The drum has at least one hole in its surface for receiving a wax to form the wax dot. Positioned between the drum and the housing is a brass block to reduce wear on the drum.

BRIEF DESCRIPTION OF THE DRAWINGS

The foregoing and other advantages of the invention will become apparent upon reading the following detailed description and upon reference to the drawings which.

While the invention is susceptive to various modifications and alternative forms, specific embodiments have been shown by way of example in the drawings and will be described in detail herein. However, it should be understood that the invention is to cover all modifications, equivalents and alternatives falling within the spirit and scope of the invention as defined by the appended claims.

DETAILED DESCRIPTION OF THE INVENTION

Surprisingly, it has been discovered that wax dots can be efficiently made with an apparatus in accordance with the present invention. The apparatus of the present invention has been found to provide smooth flow of wax within the wax channel, to reduce and eliminate wax leakage, and to efficiently deposit wax dots onto a moving web.

Figure 6:
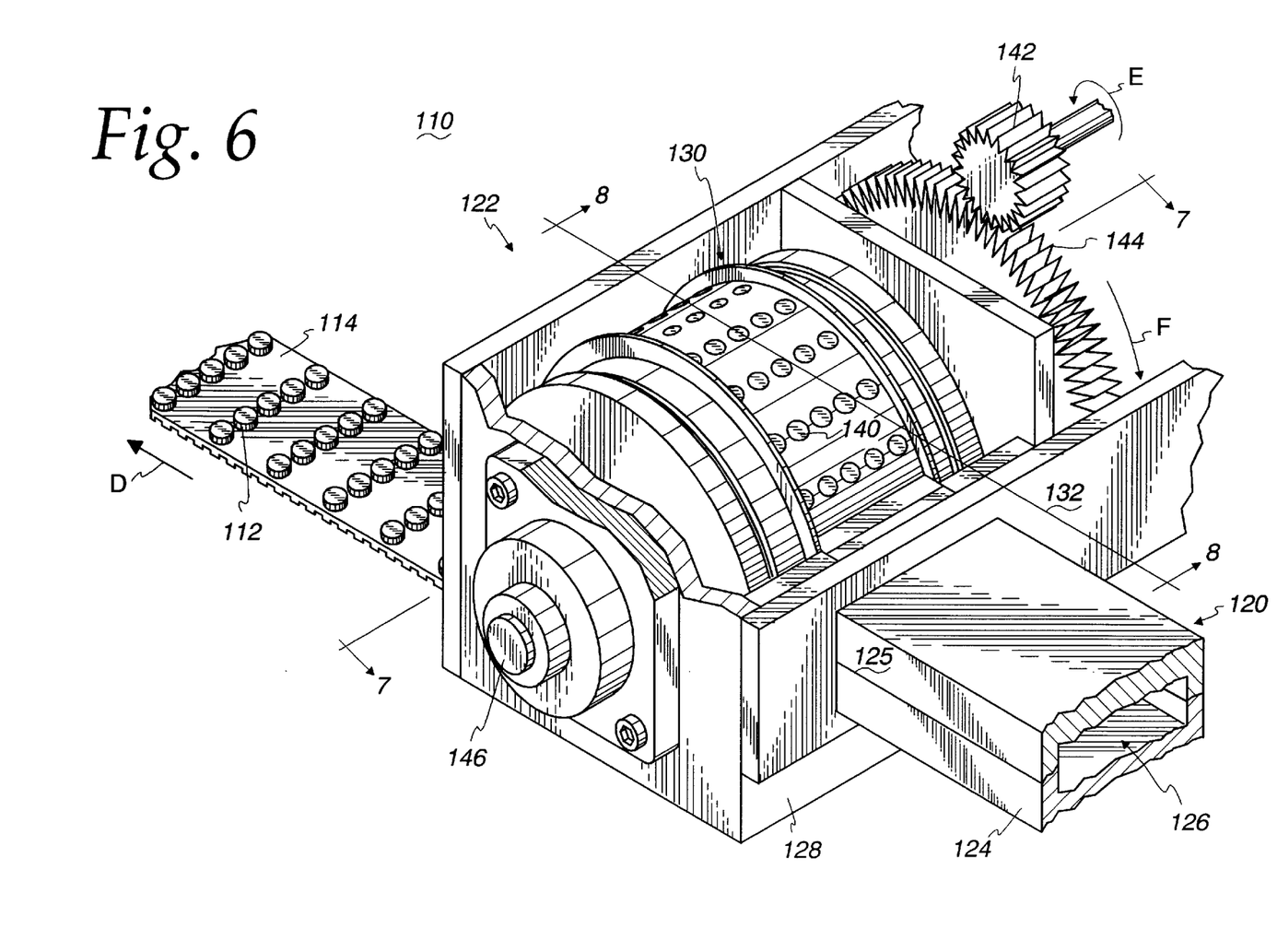
FIG. 6 is an isometric view of a wax dot machine of the present invention.

FIG. 6 illustrates a wax dot machine 110 of the present invention. The wax dot machine 110 places a row of five wax dots 112 onto a packaging web 114. In the preferred embodiment, each wax dot 112 is a cylinder with a diameter of approximately ⅜ inch and a height of approximately ¼ inch. The shape and dimensions of the wax dot 112 may be modified to support and adhere to any sized plastic clip (not shown) or other item.

The web 114 moves in the direction of the arrow D at a constant speed to provide approximately equivalent spacing between adjacent rows of wax dots 112. The web 114 is preferably a semi-rigid, transparent, plastic sheet; however, any appropriate packaging material such as foil, wax paper and kraft paper may be used. The wax dots 112 after leaving the wax dot machine 110 adhere to the web 114. The web 114 may be supplied from a roll of packaging web (not shown) and pass between a pull roller 116 (see FIG. 8) and the wax dot machine 110.

Figure 7:
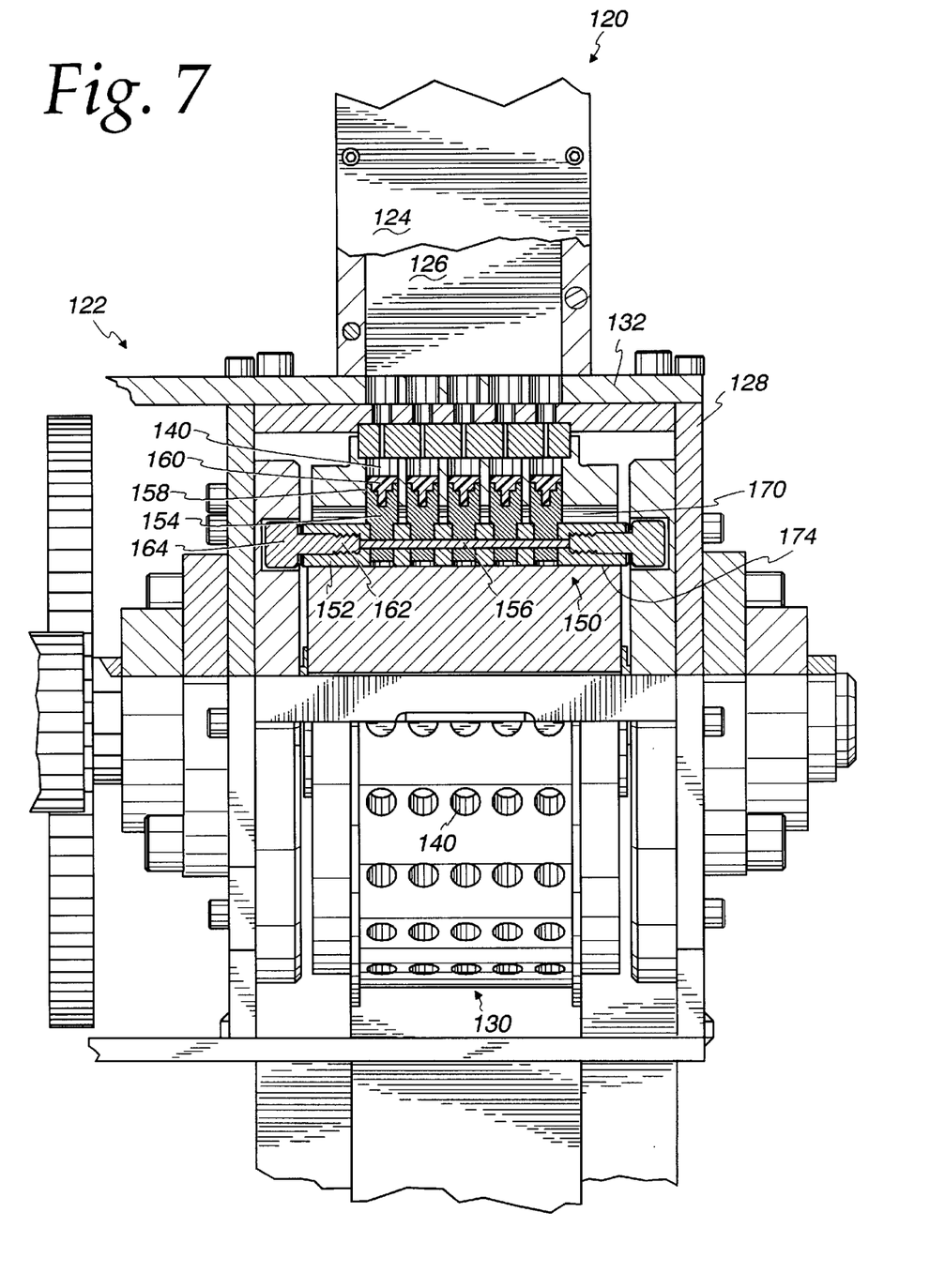
FIG. 7 is a top view of the wax dot machine of FIG. 6 along line 7—7.
Figure 8:
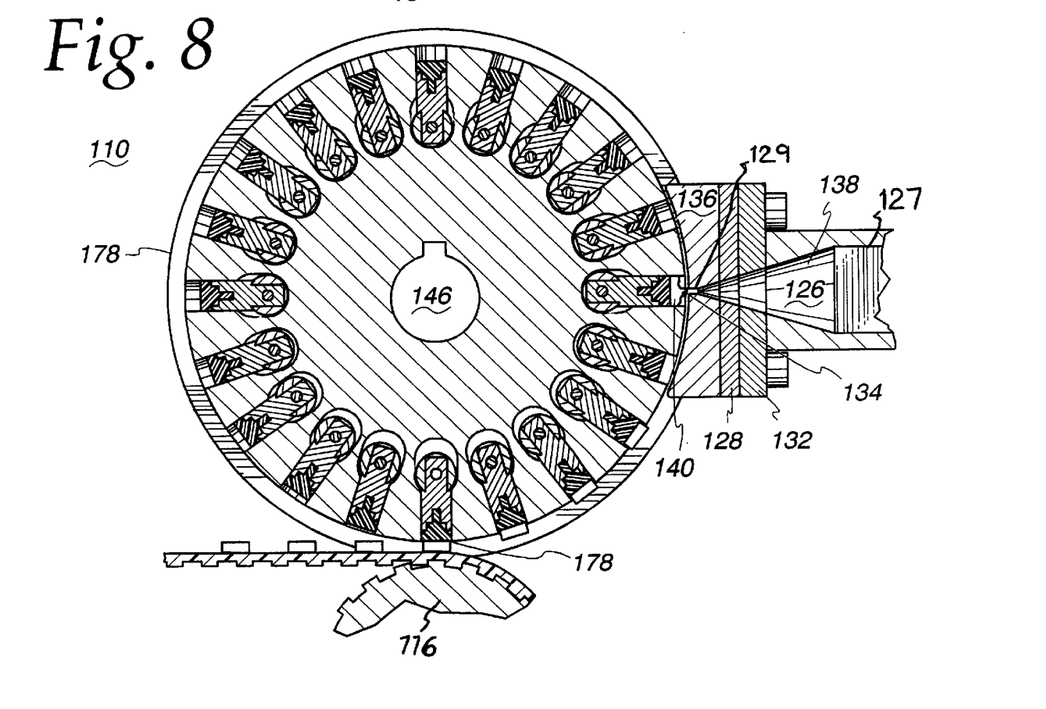
FIG. 8 is a front view of the wax dot machine of FIG. 6 along line 8—8.

The wax dot machine 110 comprises a wax feeder 120 and a wax dot former 122. The wax feeder 120 provides a wax to the wax dot former 122, and the wax dot former 122 transforms the wax into wax dots 112 that are deposited onto the web 114. The wax feeder 120 comprises a housing 124 enclosing a tapered wax channel 126. The housing 124 comprises two halves 125. FIGS. 7 and 8 more clearly illustrate the wax channel 126. The wax dot former 122 comprises a housing 128 and a drum 130. The housing 124 of the wax feeder 120 connects to the housing 128 of the wax dot former 122 through a connecting plate 132.

The wax channel 126 travels through the housing 124 of the wax feeder 120 and divides into five portions which pass through the connecting plate 132 and the housing 128 of the wax dot former 122 to five bores 134 in a block 136. The wax channel 126 communicates the wax from a wax supply (not shown) to the bores 134. A wax plunger (not shown) has a cross-section substantially matching the cross-section of the wax channel 126 having a housing diameter 127. The wax plunger moves toward the wax former 122 forcing the wax within the wax channel 126 toward the bores 134. Because the wax at room temperature is flowable under pressure, the wax plunger moving within the wax channel 126 toward the wax former 122 forces the wax into the bores 134. When the wax plunger reaches a set point, it retracts, and additional wax enters the wax channel 126 from the wax supply before the wax plunger again moves toward the bores 134.

To provide smooth wax flow from the wax supply to the bore 134, the walls 138 of the wax channel 126 taper from a housing diameter 127 in the housing 124 to a bore diameter 129 in the bore 134 reducing and eliminating any back pressure caused by sharp corners in the wax channel 126. Because the tapered wax channel 126 provides smooth wax flow, the pressure necessary to supply wax to the bores 134 is less than if sharp corners were present as illustrated in the prior art wax machine 10 of FIG. 3. Additionally, the wax channel 126, tapering as it passes through the housing 124, connecting plate 132, housing 128 and block 136, reduces the likelihood of the wax leaking between the two halves 125 of the housing 124, between the housing 124 and connecting plate 132, between the connecting plate 132 and the housing 128 and between the housing 128 and block 136. The preferred wax channel 126 as illustrated in FIG. 8 uniformly tapers from the housing diameter 127 to a bore diameter 125 within the block 136. Alternatively, the wax channel 126 could taper from the housing diameter 127 to the bore diameter 129 at either end of the block 136 to provide smooth wax flow to the wax dot former 122. Additionally, the wax channel 126 could taper to the bore diameter 129 at any point prior to the bore 134 to provide smooth wax flow.

The wax dot former 122 of the wax dot machine 110 comprises the drum 130 within the housing 128. The drum 130 has twenty rows of five holes 140. As illustrated in FIGS. 6 and 7, the holes 140 have a circular cross-section; however, other cross-sections such as rectangular or polygonal are appropriate. In the preferred embodiment, the holes 140 have a circular cross-section with a diameter of approximately ⅜ inch and a maximum depth of approximately ¼ inch to produce cylindrical wax dots 112 with a diameter of approximately ⅜ inch and a height of approximately ¼ inch. In alternative embodiments, the holes may have different diameters and maximum depths in order to produce different sized wax dots.

Each hole 140 in the drum 130 receives wax from the wax feeder 120. The wax passes through the bores 134 and fills the holes 140 forming the wax dots 112. In order to fill each of the one hundred holes 140 and to deposit the wax dots 112 onto the web 114, the drum 130 rotates within the housing 128. The rotational speed of the drum is approximately 45 revolutions per minute. To rotate the drum 140, a motor (not shown) drives a driver gear 142 in the direction of arrow E. This causes a driven gear 144 to move in the direction of arrow F which rotates the drum 130 in the direction of arrow F about an axis 146 of the drum 130. In an alternative embodiment, the drum 130 may rotate in the opposite direction.

As the drum 130 rotates about its axis 146, the rows of holes 140 individually align with the bores 134. FIG. 8 illustrates the hole 140 aligned with the bore 134. Wax from the wax channel 126 passes through the bore 134 and into the hole 140. The rotational speed of the drum 130 allows the hole 140 to completely fill with wax before the hole 140 moves past the bore 134. The block 136 traps the wax within the hole 140 to provide the wax dot 112 with a substantially flat base that will readily adhere to the web 114.

Because the drum 130 is in close contact with block 136 to provide the substantially flat base for the wax dot 112 and to prevent wax leakage, the drum 130 and block 136 endure continual frictional contact. To prevent and reduce wear of the block 136 and drum 130, the drum 130 and block 136 are composed of or covered with a wear resistant material, for example the block 136 is composed of brass and the drum 130 is composed of steel in the preferred embodiment. Providing the brass block 136 reduces the likelihood that the block 136 and drum 130 will develop scratches and grooves on their surfaces. Preventing scratches and grooves on the drum 130 and block 136 reduces the likelihood of wax leaking from the holes 138 thereby ensuring uniform wax dots 112. Additionally, the life of the drum 130 is greatly increased.

Figure 9:
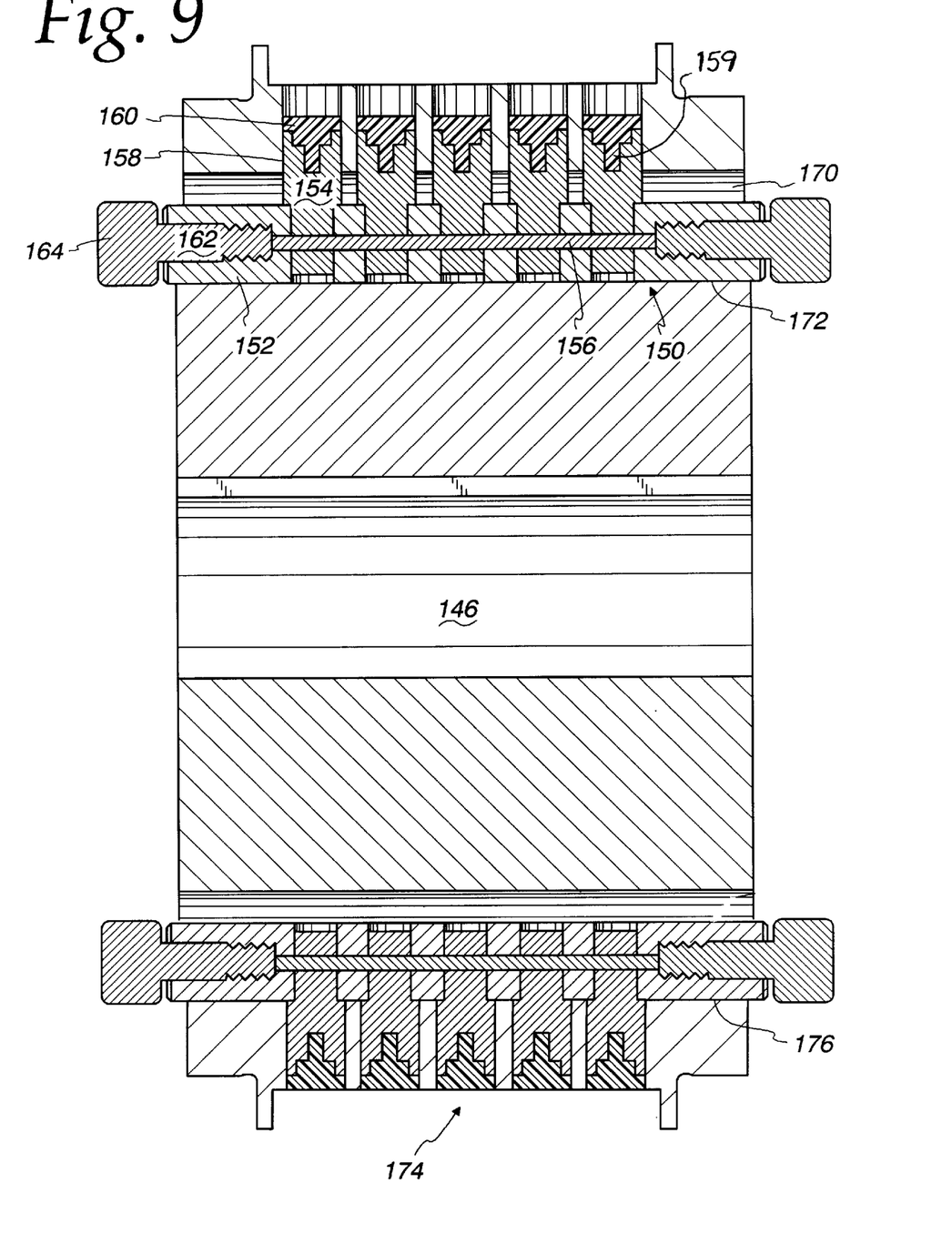
FIG. 9 is a side view of the wax dot machine of FIG. 6.

Within the drum 130 beneath each row of holes 140 is a wax dot dispenser 150. FIG. 9 illustrates a cross section of the drum 130 to illustrate the dispenser 150. The dispenser 150 comprises a cam follower 152, plungers 154 and a holding pin 156. Corresponding to the five holes 140, five plungers 154 drop fit into the cam follower 152 being held in place by the holding pin 156. The cam follower 152 has five openings corresponding to the holes 140 to accommodate the plungers 154. Each of the plungers 154 have a head 158 with a diameter substantially equal to the diameter of the hole 140 and larger than the diameter of the base portion of the plunger 154. The plungers 154 drop into the opening of the cam follower 152 until their heads 158 abut the cam follower 152. Each of the plungers 154 along with the cam follower 152 have an opening through which the holding pin 156 slides through to affix the plungers 154 to the cam follower 152. To attach the plungers 154 to the cam follower 152, an operator drops the plungers 154 into the openings of the cam follower 152 and slides the holding pin 156 through the openings of the cam follower 152 and plungers 154. To align the openings of the plungers 154, the operator simply rotates the plungers 154 until the holding pin 156 may slide through the opening. After the plungers 154 are attached to the cam follower 152 with the holding pin 156, the operator attaches a pair of bolts 162 to complete the dispenser 150.

Because the plungers 154 drop fit into the cam follower 152 with the holding pin 156 fixing them to the cam follower 152, the dispenser 150 is quickly and easily assembled by an operator. Another factor that contributes to easy and quick assembly is that the drop fit plungers 154 automatically align with the cam follower 152.

The head 158 of the plunger 154 corresponds to the bottom of the hole 140. The plunger head 158 has a diameter slightly less than the diameter of the hole 140 to allow the plunger head 158 to move within the hole 140. The plunger head 158 has a substantial well 159 filled with a silicon rubber 160. The silicon rubber 160 covers the plunger head 158 to prevent the wax from sticking to the plunger. The silicon rubber 160 provides a non-stick surface for the wax dot 112 to be easily removed from when deposited onto the web 14. Additionally, the well 159 in the plunger head provides greater area that the silicon rubber may adhere to, thus reducing the likelihood that silicon rubber 160 will become disengaged from the plunger head 158. In the preferred embodiment, the well 159 is multi-tiered and approximately ¼ inch deep to adhere the silicon rubber 160 to the plunger head 158. Additionally, the silicon rubber 160 acts as a slight cushion or spring that the wax under pressure may slightly compress. The slight compression of the silicon rubber 160 helps to gently spring the wax dot 112 onto the web 114.

Figure 10:
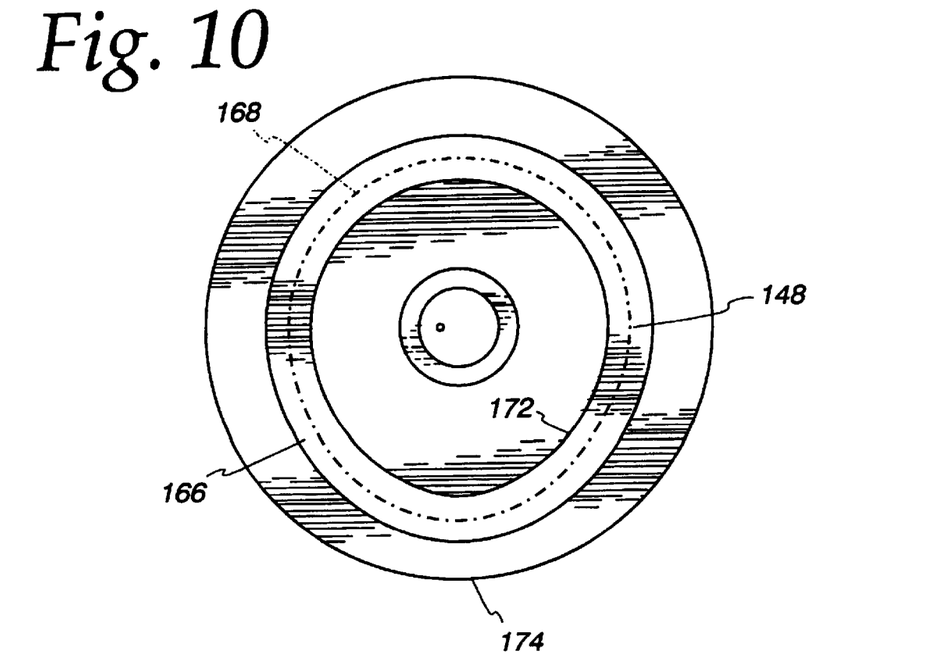
FIG. 10 is a front view of the wax dot machine of FIG. 6.

The cam follower 152 has bolts 162 connected at either end forming heads 164 that rest within a cam 166. FIG. 10 illustrates the cam 166. The width of the cam 166 is slightly greater than the diameter of the head 164 to allow the bolts 162 move along the cam 166. The rotational movement of the drum 130 moves the cam follower 152 with bolts 162 around the follower path 168 in the housing 128. In the preferred embodiment, the follower path 168 is substantially elliptical to provide the gradual release of the wax dot 112 from its hole 140. However, the follower path 168 may be modified in any manner to provide the gradual release of the wax dot 112 from its hole 140.

The cam 166 coordinates the dispensing of wax dots 112 from their holes 140 in the drum 130 onto the web 114. Following the cam 166, the cam follower 152 moves toward the axis 146 of the drum 130 to receive wax within the holes 140 and gradually away from the axis 146 of the drum 130 to deposit the wax dots 112 on the web 114. To allow motion of the cam follower 152 relative to the axis 146 of the drum 130, the cam follower 152 rests within oval bearings 170. Because the cam 166 provides for the gradual ejection of the wax dots 112, the wax dots 112 will always be positioned outside of the surface of the drum 130 when they reach the dispensing point 174 guaranteeing ejection of the wax dot 112 from the wax dot machine 110.

FIGS. 8 & 9 illustrate the operation of the dispenser 150 of the wax dot machine 110. When each row of holes 140 align with the bores 134 at point 148, the cam 166 positions the cam follower 152 against the wall 172 of the oval bearings 170 closest to the axis 146 of the drum 130. When the cam follower 152 is positioned against the wall 172 of the oval bearing 170, the plunger 154 provides the hole 140 with a depth equal to the desired height of the wax dot 112. When the holes 140 align with the bore 134, the wax passes through the bores 134 and fills the empty space within the holes 140. As the drum 130 rotates, the cam follower 152 follows the follower path 168 provided by the cam 166. After the bores 134, the cam 166 gradually moves the cam follower 152 away from the wall 172 of the oval bearing 170 and toward the wall 176 of the oval bearing 170 farthest from the axis 146. Because the cam follower 152 gradually moves away from the axis 146, the plunger 154 also gradually moves away from the axis 146 forcing the wax dot 112 over the surface of the drum 130. At the dispensing point 174 approximately 90 degrees from the bores 134, the cam follower 154 rests against the wall 176 of the oval bearing 170. At point 174, the plunger 154 has gradually moved to close the hole 140 pushing the wax dot 112 out of the drum 130 and into contact with the web 114. Upon exiting its hole 140 in the drum 130, the wax dot 112 adheres to the web 114 being carried away from the wax dot machine 110. After the dispensing point 174, the cam 166 gradually moves the cam follower 152 away from the wall 176 of the oval bearing 170 and toward the wall 172 of the oval bearing 170 closest to the axis 146. At the 180 degree point from the bores 134 to the bores 134, the cam 166 keeps the cam follower 152 against the wall 172 of the oval bearing 170. In alternative embodiment the shape of the cam 166 may be modified as long as the cam 166 provides a gradual dispensing of the wax dots 112 to guarantee ejection of the wax dots 112.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit of the invention as defined in the appended claims.

What is claimed is:

1. An apparatus for producing at least one wax dot, said apparatus comprising:

a housing;

a drum rotatably mounted within said housing, said drum having an outside surface;

at least one hole extending through said outside surface of said drum;

a generally circular stationary cam having a center, a non-bulging portion and a gradually bulging portion, said gradually bulging portion extending further from the center than said non-bulging portion and having an apex;

a cam follower operatively connected to said drum for following said non-bulging portion and said gradually bulging portion of said cam;

a plunger slidingly fitting in said hole, said plunger being operatively connected to said cam follower such that position of said follower with respect to said center of said cam determines the position of said plunger in said hole;

means for rotating said drum, so as to cause the cam follower to follow said cam, said plunger being in a retracted position as the cam follower follows said non-bulging portion, said plunger being gradually pushed toward said outer surface as the cam follower follows the gradually bulging portion, said plunger ejecting wax from said hole as the cam follower reaches said apex to produce said wax dot;

means for injecting wax into said hole when said plunger is in a retracted position.

2. The apparatus of claim 1 further comprising a block positioned between said housing and said drum said wax channel extending through said block, said block being composed of a wear resistant material.

3. The apparatus of claim 2 wherein said block is composed of brass.

4. The apparatus of claim 1 wherein said wax channel is tapered toward the drum.

5. The apparatus of claim 2 wherein said hole and said wax channel have substantially circular cross sections and wherein said wax channel is tapered to a diameter smaller than the same as the diameter of said hole.

6. The apparatus of claim 1 wherein said cam follower and said plunger are positioned beneath said surface of said drum, said plunger having a portion located within said hole, said cam follower capable of moving said plunger toward said surface of said drum and away from said surface of said drum as said cam follower follows the cam when said drum rotates, said cam positioning said cam follower and said plunger away from said surface of said drum when said hole is aligned with said wax channel and said plunger cam follower follows the non-bulging portion and gradually moving said cam follower and said plunger toward said surface of said drum as the cam follower follows the gradually bulging portion to gradually eject said wax from said hole and to eject said wax dot from said hole when the cam follower reaches the apex.

7. The apparatus of claim 6 wherein said gradually bulging portion is elliptical.

8. The apparatus of claim 7 further comprising a holding pin and wherein the plunger is attached to the cam follower by said holding pin, said plunger having a plunger head located within said hole and a plunger base attached to said cam follower.

9. The apparatus of claim 8 wherein said plunger base fits into said cam follower and said holding pin attaches said plunger base to said cam follower.

10. The apparatus of claim 6 further comprising a non-stick cap attached to the head of said plunger.

11. The apparatus of claim 10 wherein said non-stick cap comprises silicon rubber.

12. The apparatus of claim 11 further comprising a well in the head of said plunger, said cap at least partially extending into said well.

13. An apparatus for manufacturing a wax dot comprising:

a housing;

an axis mounted in said housing:

a drum rotatably mounted on said axis within said housing, said drum having a lateral cylindrical surface said surface being equidistant from said axis;

at least one hole in said surface of said drum;

a cam attached to said housing, said cam having a center a circular portion and an elliptical portion;

a cam follower connected to said drum for following said circular portion and said elliptical portion of said cam;

a plunger, said cam follower and said plunger positioned beneath said surface of said drum, said plunger having a plunger head located within said hole and a plunger base attached to said cam follower, said cam follower and said plunger head capable of moving in said hole toward and away from the surface of the drum; and a wax channel within said housing laterally aligned with said hole;

means for rotating the drum to cause the cam follower to follow the cam such that as the cam follower follows the circular portion of said cam the plunger is in a retracted position and as the cam follower follows the elliptical portion of the plunger gradually moves toward the surface, said plunger ejecting wax from said hole as the cam follower reaches the apex; and, means for supplying wax into said hole when said plunger is in a retracted position and the hole is vertically aligned with said wax channel.

14. The apparatus of claim 13 wherein said plunger base is connected to said cam follower.

15. An apparatus for manufacturing a wax dot comprising:
- a housing;
- a drum rotatably mounted within said housing, said drum having a cylindrical lateral surface;
- at least one hole in said surface of said drum;
- a dispenser positioned beneath said hole within said drum, said dispenser including a plunger capable of moving in said hole toward and away from the surface of the drum; and
- a tapered wax channel within said housing in alignment with said hole;
- a stationary cam having a center, and a camming surface, said camming surface including a circular portion and a gradually enlarged portion, said gradually enlarged portion being at a gradually increasing distance from said center;
- a cam follower for following said camming surface, said cam follower operatively connected to said plunger so as to determine the position of said plunger within said hole;
- means for rotating said drum and said cam follower so as to cause the cam follower to follow the camming surface;
- said cam follower moving the plunger into a retracted position as the follower follows the circular portion and gradually moving the plunger toward the surface as the follower follows the gradually enlarged portion, said plunger moving to the surface to eject said wax as the plunger reaches the apex.

16. The apparatus of claim 15 wherein said wax channel is tapered toward said drum.

17. The apparatus of claim 15 further comprising a block positioned between said drum and said housing.

18. The apparatus of claim 17 wherein said block is composed of brass.

19. An apparatus for manufacturing a wax dot comprising:
- a housing;
- a drum rotatably mounted within said housing, said drum having a surface said surface having at least one hole extending therethrough;
- a plunger positioned in said hole, said plunger capable of moving in said hole toward said surface to an extended position and away from said surface of said drum to a retracted position;
- a wax channel for supplying a wax into said hole when said hole is aligned with said wax channel;
- a cam and a cam follower for controlling the position of the plunger said plunger being moved to a retracted position so that wax from said wax channel can be injected into said hole and being moved to an extended position to eject wax from said hole; and
- means for rotating said drum and said cam follower.

20. The apparatus of claim 19 wherein said block is composed of brass.

21. An apparatus for manufacturing a plurality of wax dots and ejecting them onto a substrate, comprising:
- a housing;
- an axis mounted in said housing;
- a drum rotatable mounted on said axis within said housing, said drum having a cylindrical lateral surface, said surface being parallel to the axis;
- a plurality of rows of holes in said surface of said drum;
- a plurality of cam followers operatively connected to said drum, one for each row of holes;
- a plurality of plungers, each plunger attached to the cam follower for its respective row of holes, said cam followers and said plungers positioned beneath said surface of said drum, each said plunger having a plunger head located within said hole and a plunger base attached to said cam follower, each said cam follower capable of moving plungers attached thereto toward and away from the surface of the drum;
- a stationary cam having a generally circular portion and a gradually enlarging portion, said gradually enlarging portion having an apex;
- a plurality of wax channels within said housing, said wax channels arranged in a row each wax channel laterally aligned with holes in said drum;
- means for rotating said drum about said axis so as to cause said cam followers to follow the cam each cam follower moving the plungers attached thereto to a retracted position when the cam follower follows the circular portion of the cam and moving the plungers gradually toward the surface of the drum when the cam follower follows the gradually enlarging portion of said cam so as to eject wax in said holes as wax dots onto a substrate when said cam follower reaches the apex of said gradually enlarging portion: and,
- means for supplying wax from said wax channels into said holes while said plungers are in a retracted position and said holes are aligned with said wax channels.

22. The apparatus of claim 21 further comprising a plurality of silicon rubber, caps, said caps covering said heads.

23. The apparatus of claim 22 wherein said substrate comprises a packaging web.

24. The apparatus of claim 23 wherein said gradually enlarging portion is elliptical.

* * * * *